(12) United States Patent
Jones et al.

(10) Patent No.: US 8,837,876 B2
(45) Date of Patent: Sep. 16, 2014

(54) SYSTEMS AND METHODS FOR IMPLEMENTING OPTICAL AND RF COMMUNICATION BETWEEN ROTATING AND STATIONARY COMPONENTS OF A ROTARY SENSOR SYSTEM

(71) Applicant: L-3 Communications Corporation, New York, NY (US)

(72) Inventors: Thomas Webster Jones, Boulder Creek, CA (US); James Edward Baloun, Palo Alto, CA (US)

(73) Assignee: L-3 Communications Corporation, New York, NY (US)

( * ) Notice: Subject to any disclaimer, the term of this patent is extended or adjusted under 35 U.S.C. 154(b) by 62 days.

(21) Appl. No.: 13/736,497

(22) Filed: Jan. 8, 2013

(65) Prior Publication Data

US 2014/0193149 A1  Jul. 10, 2014

(51) Int. Cl.
*G02B 6/26* (2006.01)
*G02B 6/42* (2006.01)
*G02B 6/36* (2006.01)
*H04B 10/2575* (2013.01)

(52) U.S. Cl.
CPC .......... *H04B 10/2575* (2013.01); *G02B 6/3604* (2013.01); *G02B 6/26* (2013.01)
USPC ......................................................... 385/26

(58) Field of Classification Search
CPC ...... G02B 6/32; G02B 6/3604; G02B 6/4246; G02B 6/26; G02B 6/42; H01Q 3/02; H01Q 3/26; H01Q 1/22; H01Q 1/282; H01Q 21/0075; H01Q 21/065; H01Q 5/0013; H04B 10/22; H04B 10/225
USPC ............................ 385/25, 26, 16, 34, 77, 115
See application file for complete search history.

(56) References Cited

U.S. PATENT DOCUMENTS

| 4,233,580 A | 11/1980 | Treczka et al. |
| 4,284,409 A | 8/1981 | Van Teslaar |
| 4,466,695 A | 8/1984 | Kruger |
| 5,140,289 A | 8/1992 | Andrieu et al. |
| 5,377,035 A | 12/1994 | Wang et al. |

(Continued)

FOREIGN PATENT DOCUMENTS

WO     WO 9857388     12/1998

OTHER PUBLICATIONS

Warwick et al., "Sharper Eye", Aviation Week & Space Technology, Apr. 4, 2011, 2 pgs.

(Continued)

*Primary Examiner* — Charlie Peng
*Assistant Examiner* — Erin Chiem
(74) *Attorney, Agent, or Firm* — Egan, Peterman & Enders LLP.

(57) ABSTRACT

Systems and methods are disclosed for implementing a rotary sensor system including rotating system components in RF signal and optical signal communication with stationary system components through a rotary coupler. The rotary coupler may be provided with an optical transmission line that passes inside or through the center of an inner conductor of a coaxial RF transmission line that itself extends across the rotational interface/s of the rotary coupler such that optical and RF signal energy may be provided simultaneously or otherwise across the rotary coupler using separate communication paths. A rotary sensor system may be further configured to convert multiple signals and/or types of signals to a common multiplexed optical signal stream for transmission together across an on-axis rotational optical interface of the rotary coupler.

20 Claims, 14 Drawing Sheets

(56) References Cited

U.S. PATENT DOCUMENTS

| | | |
|---|---|---|
| 5,639,173 A | 6/1997 | Eng |
| 5,751,242 A | 5/1998 | Goutzoulis et al. |
| 5,805,115 A | 9/1998 | Pellerin et al. |
| 6,064,288 A | 5/2000 | Norman et al. |
| 6,160,522 A | 12/2000 | Sanford |
| 6,907,161 B2 | 6/2005 | Bowman |
| 7,162,156 B2 | 1/2007 | Frey et al. |
| 7,212,101 B2 | 5/2007 | Lohr |
| 7,260,292 B2 | 8/2007 | Sahlgren et al. |
| 7,293,920 B2 | 11/2007 | Arena |
| 7,782,159 B2 | 8/2010 | Beckley et al. |
| 7,792,400 B1 | 9/2010 | Zhang et al. |
| 7,881,569 B2 | 2/2011 | Zhang et al. |

OTHER PUBLICATIONS

Moog, "Fiber Optic Devices", Printed from Internet Sep. 28, 2012, 2 pgs.

Moog, "Fiber Optic Devices", Printed from Internet Sep. 28, 2012, 1 pg.

Princetel, "Fiber Optic Rotary Joints", Printed from Internet Sep. 28, 2012, 2 pgs.

Princetel, Forj Catalog 2009O, Obtained from Internet in Jul. 2012, 8 pgs.

Rainscanner, "Product Brochure", Obtained from Internet in Jul. 2012, 24 pgs.

Weather Radar Training Course, May 2010, 65 pgs.

Vollbracht et al., "Waveguide Fibre Optic Rotary Joint for Antenna Mounted Radar Receivers", Selex-Si, Gematronik, Obtained from Internet in Jul. 2012, 1 pg.

Dorsey, Moog, "Enabling Technologies", Document No. 205, 2006, 6 pgs.

Dorsey, Moog, "High-Speed Data Transmission and Rotary Platform", Document No. 204, 2005, 15 pgs.

Zhang et al., "Let the Great World Spin", Fiber Optic Rotary Joints Add a Spin to Sensing, Mobile, and Robotic Fiber Systems, Jul. 2009, 4 pgs.

Schleifring, "Slip Ring Solutions/Fiber Optics", Obtained from Internet in Jul. 2012, 20 pgs.

Northrop Grumman, E-2 Hawkeye, Eye on the Future, 2006, 17 pgs.

Northrop Grumman, Right Now, 2009, 28 pgs.

Cobham Antenna Systems, Air Traffic Control Rotary Couplers, Radar and R.F. Microwave Products, Obtained from Internet in Jul. 2012, 2 pgs.

Cobham Defense Systems, Rotating Electro Mechanical Microwave Sub Systems, Radar and R.F. Microwave Products, Obtained from Internet in Jul. 2012, 6 pgs.

Spinner, Spotlight, High Frequency Performance Worldwide, Rotary Joint Articles, Obtained from Internet in Jul. 2012, 51 pgs.

Moog, Fiber Optics Rotary Joints (FORJ), Obtained from Internet Jul. 2012, 2 pgs.

Moog, "Fiber Optic Rotary Joints", Technical Brief, No. 303, 2008, 6 pgs.

L-3, "FORJ-Enabling Growth Technology for E-2D", $8^{th}$ International Hawkeye Users Conference, Apr. 2011, 14 pgs.

Diamond, Rotary Joints, Weather Radar, labelled "1.2011", 12 pgs.

Jones et al., Systems and Methods for Providing Optical Signals Through a RF Channel of a Rotary Coupler: U.S. Appl. No. 13/736,420, filed Jan. 8, 2013, 47 pgs.

SYSTEMS AND METHODS FOR IMPLEMENTING OPTICAL AND RF COMMUNICATION BETWEEN ROTATING AND STATIONARY COMPONENTS OF A ROTARY SENSOR SYSTEM

RELATED APPLICATIONS

The present application is related in subject matter to concurrently filed patent application Ser. No. 13/736,420 entitled "SYSTEMS AND METHODS FOR PROVIDING OPTICAL SIGNALS THROUGH A RF CHANNEL OF A ROTARY COUPLER" by Jones et al., which is incorporated herein by reference in its entirety.

FIELD OF THE INVENTION

This invention relates generally to rotary sensor systems and more particularly to rotary sensor systems employing optical and RF communication between rotating and stationary components of a rotary sensor system.

BACKGROUND OF THE INVENTION

Radar and passive RF detection systems having one or more rotating antennas are used in airborne, shipboard and ground based installations. The typical electrical interface to an antenna is one or more radio frequency (RF) transmission line(s). In general, this type of system employs a RF rotary coupler to interconnect the rotating antenna to the electronics that remains stationary relative to the rotating antenna. Such rotary couplers are capable of providing radio frequency (RF) energy to and receiving RF energy from, the rotating antenna(s) through one or more separate transmission lines or channels. A typical rotary coupler with separate transmission lines has one coaxial transmission line (RF channel 1) through which no other RF transmission lines pass. The remaining coaxial transmission lines (RF channels 2 and more) are arranged such that each additional transmission line is coaxial with the other transmission lines, and such that each given additional transmission line allows the other transmission lines to pass through the center of the given additional transmission line.

The rotating antenna assembly may also house sensor electronics to support a variety of different applications. The sensor electronics, housed in the rotating antenna assembly, require the bi-directional flow of data and/or control signals and these signals are typically passed through a rotary device which provides the interface to the stationary platform electronics.

Traditionally the data/control signal for sensor electronics, in a rotating antenna application, is realized with a multi-circuit slip ring assembly. Multi-circuit slip ring assemblies are designed to pass electrical data/control signals. Some draw-backs with this technology include the potential for a large number of circuits required to support the electronic bus architecture, potential bandwidth limitations in passing data across a multi-circuit slip ring assembly and potential EMI (electromagnetic interference) concerns in high power RF applications. It is also not uncommon for certain applications, such as airborne installations, to have physical packaging constraints which will limit the available volume for a slip ring installation which could limit system capability.

FIG. 1 is a cross sectional view of a conventional two channel radio frequency (RF) rotary coupler assembly 100 having a stator portion 102 and a mating rotor portion 104. Rotary coupler 100 is configured to transmit two RF channels, referred to as Channel 1 and Channel 2, across rotational interface/s of the coupler 100 that are formed between mating stator portion 102 and rotor portion 104 of the coupler 100. Channel 1 is a RF channel transmitted on the central axis of rotary coupler 100 and Channel 2 is a RF channel transmitted off of the central axis of rotary coupler 100. As shown, a stationary coaxial signal input 113 is provided on stator portion 102 for the RF signals of Channel 1, and a stationary coaxial signal input 115 is provided on stator portion 102 for the RF signals of Channel 2. Similarly, a rotating (rotor) coaxial signal output 114 is provided on rotor portion 104 for the RF signals of Channel 1, and a rotating (rotor) coaxial signal output 116 is provided on rotor portion 104 for the RF signals of Channel 2.

Still referring to FIG. 1, rotor portion 104 is rotationally guided relative to stator portion 102 by a pair of ball-bearing assemblies 144. Rotary coupler 100 is sealed to allow for control of the internal environment which is exposed to RF energy by, o-ring seals 145 between parts of the coupler that do not rotate relative to each other, and by wiper seals 146 provided between parts of the rotor 104 that rotate relative to parts of the stator 102 of the rotary coupler 100. RF energy is conducted through Channel 1 of rotary coupler 100 by way of a transmission line formed between the surfaces of the internal cavities 147a and 147b. RF energy is conducted through Channel 2 of rotary coupler 100 by way of a transmission line with matching stub circuits formed between the surfaces of internal cavities 148a and 148b. Between the rotor portion 104 and stator portion 102 of the rotary coupler 100, RF energy of Channels 1 and/or 2 is made to pass by close-fitting concentric cylindrical surfaces separated by a thin layer of dielectric material which form corresponding stepped impedance chokes 117, 118, 119 and 120, between the rotor and stator portions 104 and 102 of the rotary coupler 100.

As shown in FIG. 1, a coaxial transmission line is provided for transmitting RF signals of Channel 1 between stationary coaxial signal input 113 and rotating coaxial output 114, and a coaxial transmission line is provided for transmitting RF signals of Channel 2 between stationary coaxial signal input 115 and rotating coaxial output 116. Specifically, a center conductor is provided for Channel 1 that includes a stationary on-axis inner conductor portion 122 in RF signal communication with a rotating on-axis inner conductor portion 121 across a rotational interface formed by close-fitting concentric cylindrical surfaces of an innermost stepped impedance choke 117 that is located between the stationary portion 122 of the inner conductor of Channel 1 and the adjacent rotating portion 121 of the inner conductor of Channel 1. An outer conductor is formed for Channel 1 by stepped impedance choke 118 that is located between the stationary portion 192 of the outer conductor of Channel 1 and the adjacent rotation portion 191 of the outer conductor of Channel 1. Similarly, a center conductor is provided for Channel 2 that includes a stationary off-axis inner conductor portion 192 in RF signal communication with a rotating coaxial inner conductor portion 191 across a rotational interface formed by close-fitting concentric cylindrical surfaces of a stepped impedance choke 120 that is located between the stationary portion 192 of the inner conductor of Channel 2 and the adjacent rotating portion 191 of the inner conductor of Channel 2. Similarly, an outer conductor is formed for Channel 2 by outermost stepped impedance choke 119 that is located between the rotating portion 181 of the outer conductor of Channel 2 and adjacent stationary portion 182 of the outer conductor of Channel 2 and the bearing inner race support housing 125.

FIG. 2 is a partial enlarged view 200 of the stepped impedance choke 117 of the rotary coupler assembly 100 of FIG. 1.

As shown, the stepped impedance choke 117 is formed between stationary on-axis inner conductor portion 122 of the Channel 1 transmission line and the rotating on-axis inner conductor portion 121 of the Channel 1 transmission line. Also shown, the stepped impedance choke 118 is formed between stationary outer conductor portion 192 of the Channel 1 transmission line and the rotating outer conductor portion 191 of Channel 1 transmission line.

SUMMARY OF THE INVENTION

Disclosed herein are systems and methods for transferring both optical and RF energy through a rotary coupler. Using the disclosed systems and methods, optical and RF energy may be provided simultaneously or otherwise across a rotary coupler using separate communication paths through a coaxial transmission line that incorporates an on-axis fiber optic transmission line, e.g., to simultaneously transfer optical signals and RF signals between a stationary and a rotating section of a coaxial transmission line that extends across rotational interface/s of the rotary coupler. The disclosed systems and methods may be advantageously implemented in one exemplary embodiment to provide a rotary coupler that interconnects components of a rotating assembly (e.g., rotating antenna assembly including any associated rotating electronics) in optical and RF signal communication with other electronics that remain stationary relative to the rotating assembly of a given mobile or fixed platform (e.g., platform such as aircraft, ship, train, automobile, land installation such as radar station or satellite station or control tower, etc.). Wherever the term "rotating" is used herein to describe a given component it will be understood that such a given component may be also be described as rotatable, i.e., configured to rotate relative to a corresponding stationary component whether or not actual rotation is occurring at any given time.

In one exemplary embodiment, a rotary coupler may be provided with an optical transmission line (e.g., a single or multiple mode fiber optic line) that passes inside or through the center of an inner conductor of a coaxial RF transmission line that itself extends across the rotational interface/s of the rotary coupler. In such an embodiment, both the optical transmission line and the RF transmission line may be positioned at, or close to, the axis of rotation of the rotary coupler. In a further embodiment, a rotary coupler may be provided that is configured to transfer optical signals and multiple RF channels across the rotational interface/s of a rotary coupler. In another exemplary embodiment, a rotary coupler may be configured to transfer optical and RF energy across rotational interface/s of the rotary coupler using an optical rotary joint positioned inside the inner conductor of a first RF channel transmission line that itself is substantially centered at, and in line with, the rotational axis of the rotary coupler. When integrated inside or within an on-axis RF transmission line of a rotary coupler, an optical transmission line may advantageously provide on-axis optical signal communication through the rotary coupler without adversely impacting or affecting the on-axis RF signal transmissions through the rotary coupler. In a further embodiment, the optical rotary joint may be positioned adjacent to a stepped impedance choke that is provided between the fixed and rotating portions of the inner conductor of the first RF channel transmission line.

In one exemplary embodiment, the disclosed systems and methods may be implemented to convert multiple signals and/or types of signals (e.g., RF signals, video signals, audio signals, control signals, data signals, computer network signals such as Ethernet, etc.) to a common multiplexed optical signal stream that includes information from the various signals for transmission together across an on-axis rotational optical interface (e.g., optical rotary joint) of the rotary coupler. Such optical communication may be bidirectional or unidirectional, and may occur through the inside of an on-axis RF transmission line that simultaneously transmits RF signals across the an on-axis rotationally RF interface.

In one respect, disclosed herein is a rotary sensor system, including: rotatable system components including rotatable sensor electronics, at least one rotatable RF sensor, and at least one rotatable optical signal communication component; stationary system components including stationary RF sensor electronics for the at least one rotatable RF sensor, and at least one stationary optical signal communication component; and a rotary coupler coupled between the stationary system components and the rotatable system components, the rotary coupler having a stator portion rotatably coupled to a rotor portion. The stator portion may be coupled between the stationary system components and the rotor portion, and the rotor portion may be coupled between the rotatable system components and the stator portion such that the rotor portion rotates together with the rotatable system components relative to the stator portion and the stationary system components. The stator portion may include a stationary RF conductor portion of a center RF transmission line, and the rotor portion may include a rotatable RF conductor portion of the center RF transmission line, with the rotor portion being configured to rotate about a rotational axis relative to the stator portion. The stationary RF conductor portion and the rotatable RF conductor portion of the center RF transmission line may be disposed in adjacent rotatable relationship to form a first part of a center RF signal channel that extends across a rotational RF signal interface defined between the stationary RF conductor portion and the rotatable RF conductor portion of the center RF transmission line to couple the at least one rotatable RF sensor in RF signal communication with the stationary RF sensor electronics. The stator portion may further include a stationary optical conductor portion of an optical transmission line, and the rotor portion may further include a rotatable optical conductor portion of the optical transmission line. The stationary optical conductor portion and the rotatable optical conductor portion may be disposed in adjacent rotatable relationship to form an on-axis optical signal channel coincident with the rotational axis of the rotor portion and extending across a rotational optical signal interface defined between the stationary optical conductor portion and the rotatable optical conductor portion to couple the at least one stationary optical signal communication component in optical signal communication with at least one rotatable optical signal communication component. The rotational optical signal interface may be disposed within the center RF transmission line.

In another respect, disclosed herein is a method of operating a rotary sensor system, including the step of providing a rotary sensor system. The rotary sensor system may have rotatable system components including rotatable sensor electronics, at least one rotatable RF sensor, and at least one rotatable optical signal communication component. The rotary sensor system may also have stationary system components that include stationary RF sensor electronics for the at least one rotatable RF sensor, and at least one stationary optical signal communication component. A rotary coupler may be coupled between the stationary system components and the rotatable system components of the provided rotary sensor system. The rotary coupler may have a stator portion rotatably coupled to a rotor portion, with the stator portion being coupled between the stationary system components and the rotor portion, and the rotor portion being coupled between the rotatable system components and the stator portion such that the rotor portion rotates together with the rotatable system components relative to the stator portion and the stationary system components. The stator portion may include a stationary RF conductor portion of a center RF transmission line, and the rotor portion may include a rotatable RF conductor portion of the center RF transmission line, with the rotor portion being configured to rotate about a rotational axis relative to the stator portion. The stationary RF conductor portion and the rotatable RF conductor portion of the center RF transmission line may be disposed in adjacent rotatable relationship to form a first part of a center RF signal channel that extends across a rotational RF signal interface defined between the stationary RF conductor portion and the rotatable RF conductor portion of the center RF transmission line to couple the at least one rotatable RF sensor in RF signal communication with the stationary RF sensor electronics. The stator portion may further include a stationary optical conductor portion of an optical transmission line, and the rotor portion may further include a rotatable optical conductor portion of the optical transmission line. The stationary optical conductor portion and the rotatable optical conductor portion may be disposed in adjacent rotatable relationship to form an on-axis optical signal channel coincident with the rotational axis of the rotor portion and extending across a rotational optical signal interface defined between the stationary optical conductor portion and the rotatable optical conductor portion to couple the at least one stationary optical signal communication component in optical signal communication with at least one rotatable optical signal communication component. The rotational optical signal interface may be disposed within the center RF transmission line, and the method may further include communicating optical signals between the at least one stationary optical signal communication component and the at least one rotatable optical signal communication component across the rotational optical signal interface.

DESCRIPTION OF ILLUSTRATIVE EMBODIMENTS

Figure 1:
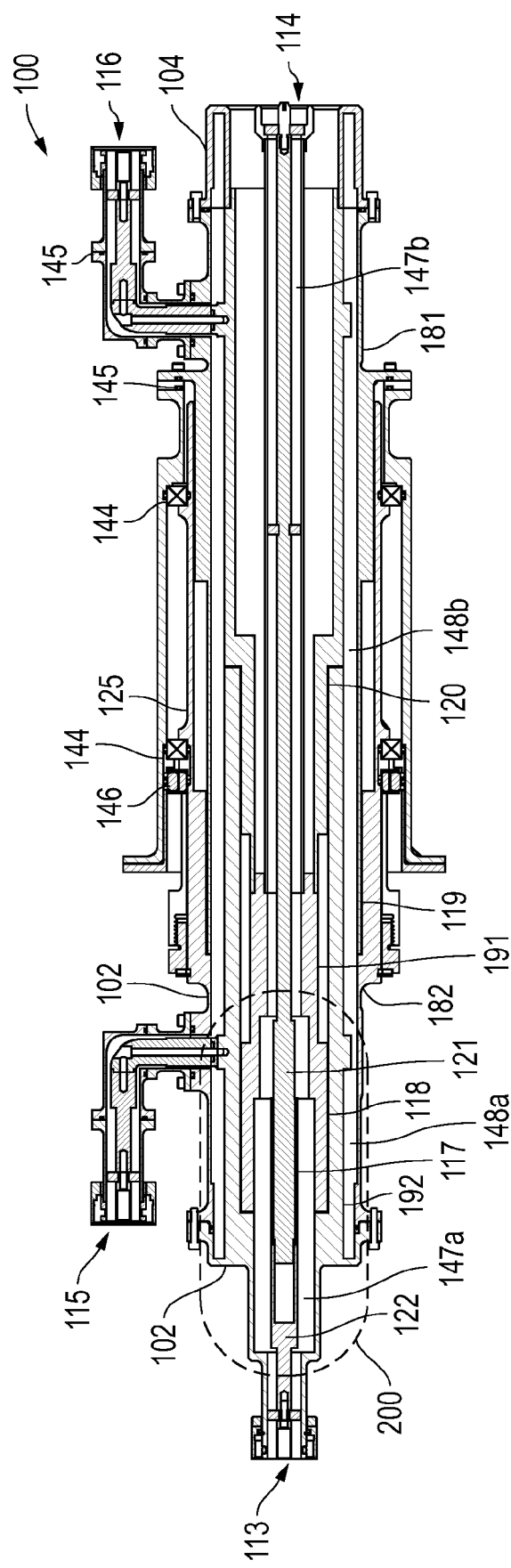
FIG. 1 is a cross-sectional view of a conventional coaxial rotary coupler.
Figure 2:
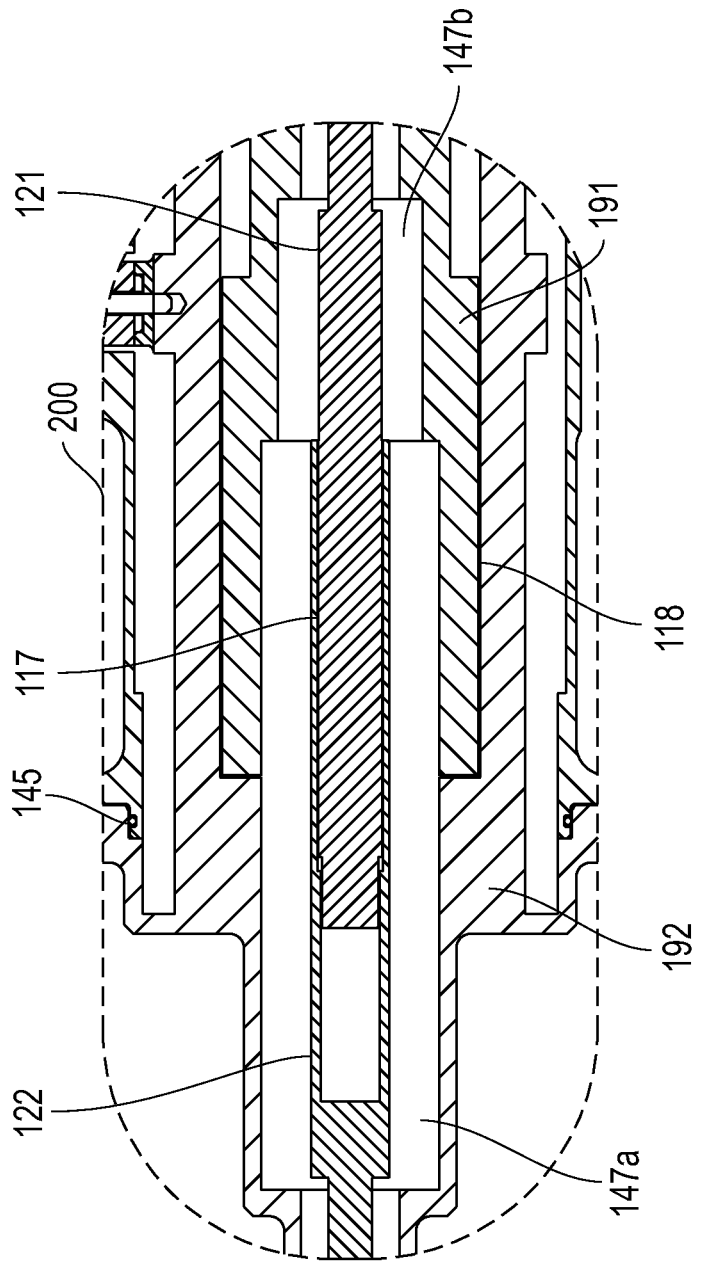
FIG. 2 is a partial enlarged view from FIG. 1.
Figure 3:
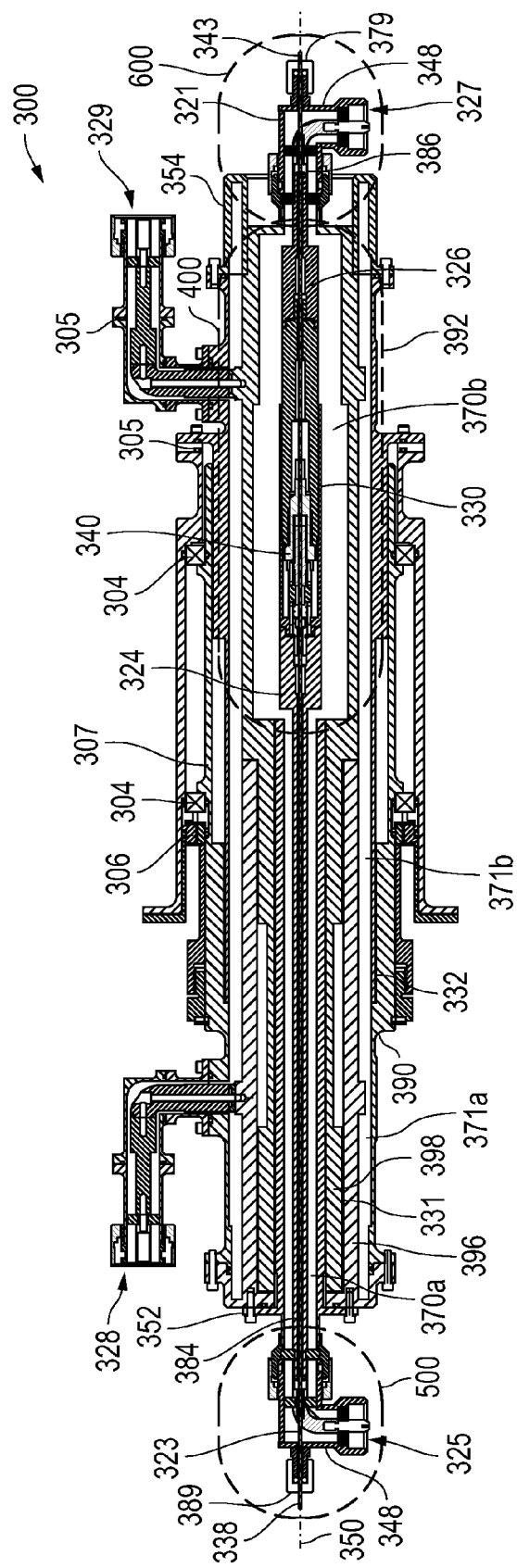
FIG. 3 is a cross sectional view of a rotary coupler assembly according to one exemplary embodiment of the disclosed systems and methods.
Figure 9:
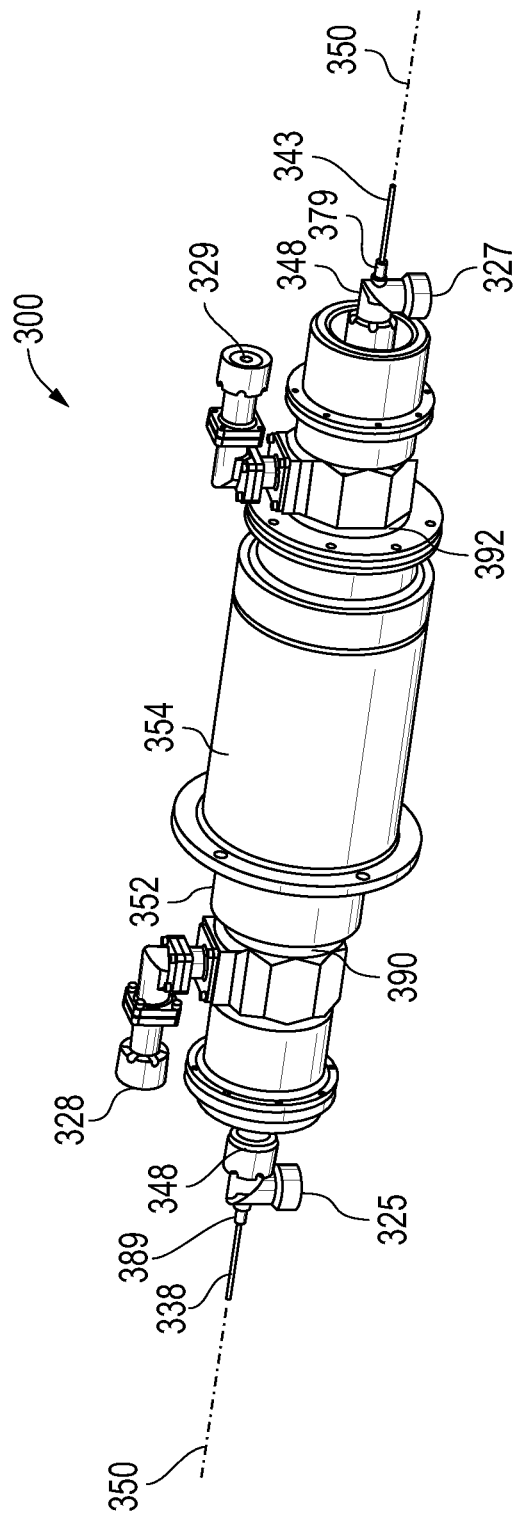
FIG. 9 illustrates an outer perspective view of the embodiment of FIG. 3.

FIG. 3 is a cross sectional view of a combined multiple channel (in this example dual-channel) radio frequency (RF) and optical rotary coupler assembly 300 according to one exemplary embodiment of the disclosed systems and methods. For further reference, FIG. 9 is an outer perspective view of the optical rotary coupler assembly 300 of FIG. 3. In the illustrated embodiment FIG. 3, rotary coupler 300 has a stator portion 352 and a mating rotor portion 354, and is configured to transmit an optical signal channel and two RF signal channels (referred to herein as RF channels 1 and 2) in a direction substantially parallel with the longitudinal axis 350 of rotary coupler 300, and across rotational interface/s that are formed between mating stator portion 352 and rotor portion 354 of coupler 300. It will be understood, however, that a combined RF and optical rotary coupler may alternatively be configured in other embodiments to similarly transmit an optical signal in combination with only one RF signal channel, or in combination with more than two RF signal channels. In the illustrated embodiment of FIG. 3, the optical signal channel is transmitted on the central axis of rotary coupler 300 together with RF channel 1 which is also transmitted on the central axis of rotary coupler 300, with optical conductor portions 338 and 343 of the transmission line of the optical channel extending through the center of the inner RF conductor portions 384 and 386 (including RF component coupler portions 324 and 326) of the on-axis RF channel 1. Also as shown, RF channel 2 is transmitted off of the central axis of rotary coupler 300.

Still referring to FIG. 3, a stationary RF signal input 325 (e.g., coaxial connection) is provided on stator portion 352 of rotary coupler 300 for the signals of RF Channel 1, and another stationary RF signal input 328 (e.g., coaxial connection) is provided on stator portion 352 of rotary coupler 300 for the signals of RF Channel 2. Similarly, a rotating coaxial signal output 327 is provided on rotor portion 354 of rotary coupler 300 for the signals of RF Channel 1, and a rotating coaxial signal output 329 is provided on rotor portion 354 of rotary coupler 300 for the signals of RF Channel 2. As also shown, a stationary optical input 389 for a stationary fiber optic conductor portion 338 is provided for the optical channel on stator portion 352 of rotary coupler 300, and a rotating optical output 379 for a rotating fiber optic conductor portion 343 is provided for the optical channel on rotor 354 of rotary coupler 300. Although the terms "input" and "output" are used herein to refer to the stator and rotor portions of the rotary coupler 300, it will be understood that RF and optical signal communication across the rotary coupler 300 may be bi-directional.

As shown, rotor portion 354 of RF coupler 300 is rotationally guided relative to stator portion 352 by, for example, ball-bearing assemblies 304. Rotary coupler 300 may also be sealed to allow for control (e.g., pressurization) of the internal environment which is exposed to RF energy using o-ring seals 305 or any other suitable static seal between parts of the coupler that do not rotate relative to each other, and using low-friction wiper seals 306 or other suitable dynamic seal between parts of the rotor 354 that rotate relative to parts of the stator 352 of the rotary coupler 300. RF energy is conducted through Channel 1 of rotary coupler 300 by way of a transmission line formed between the surfaces of the internal cavities 370a and 370b of the rotary coupler to contain RF energy. RF energy is conducted through Channel 2 of rotary coupler 300 by way of a transmission line with matching stub circuits formed between the surfaces of internal cavities 371a and 371b. For example, RF energy of RF channels 1 and/or 2 may be made to pass by close-fitting concentric cylindrical surfaces separated by a thin layer of dielectric material which form corresponding stepped impedance chokes 330, 331, and 332, between the rotor and stator portions 354 and 352 of the rotary coupler 300.

In the specific embodiment of FIG. 3, a coaxial transmission line is provided for transmitting signals of RF Channel 1 between stationary coaxial signal input 325 and rotating coaxial output 327, and a coaxial transmission line is provided for transmitting signals of RF Channel 2 between stationary coaxial signal input 328 and rotating coaxial output 329. Specifically, a center conductor is provided for RF Channel 1 that includes a stationary on-axis inner conductor coupler portion 324 in RF signal communication with a rotating on-axis inner conductor coupler portion 326 across a rotational interface formed by close-fitting concentric cylindrical surfaces of an innermost stepped impedance choke 330 that is positioned between the stationary conductor coupler portion 324 of the inner conductor of RF Channel 1 and the adjacent rotating conductor coupler portion 326 of the inner conductor of RF Channel 1. Similarly, an outer conductor may be formed for RF Channel 2 by outermost stepped impedance choke 332 having close-fitting concentric cylindrical surfaces that may be provided as shown between the outer rotating conductor portion 392 of the outer conductor of RF Channel 2 and adjacent outer stationary conductor portion 390 of the outer conductor of RF Channel 2 and the bearing inner housing 307 A middle stepped impedance choke 331 having close-fitting concentric cylindrical surfaces may also be provided as shown between an inner rotating conductor portion 398 and an outer stationary conductor portion 396 that together form part of the inner conductor of RF channel 2.

Figure 4:
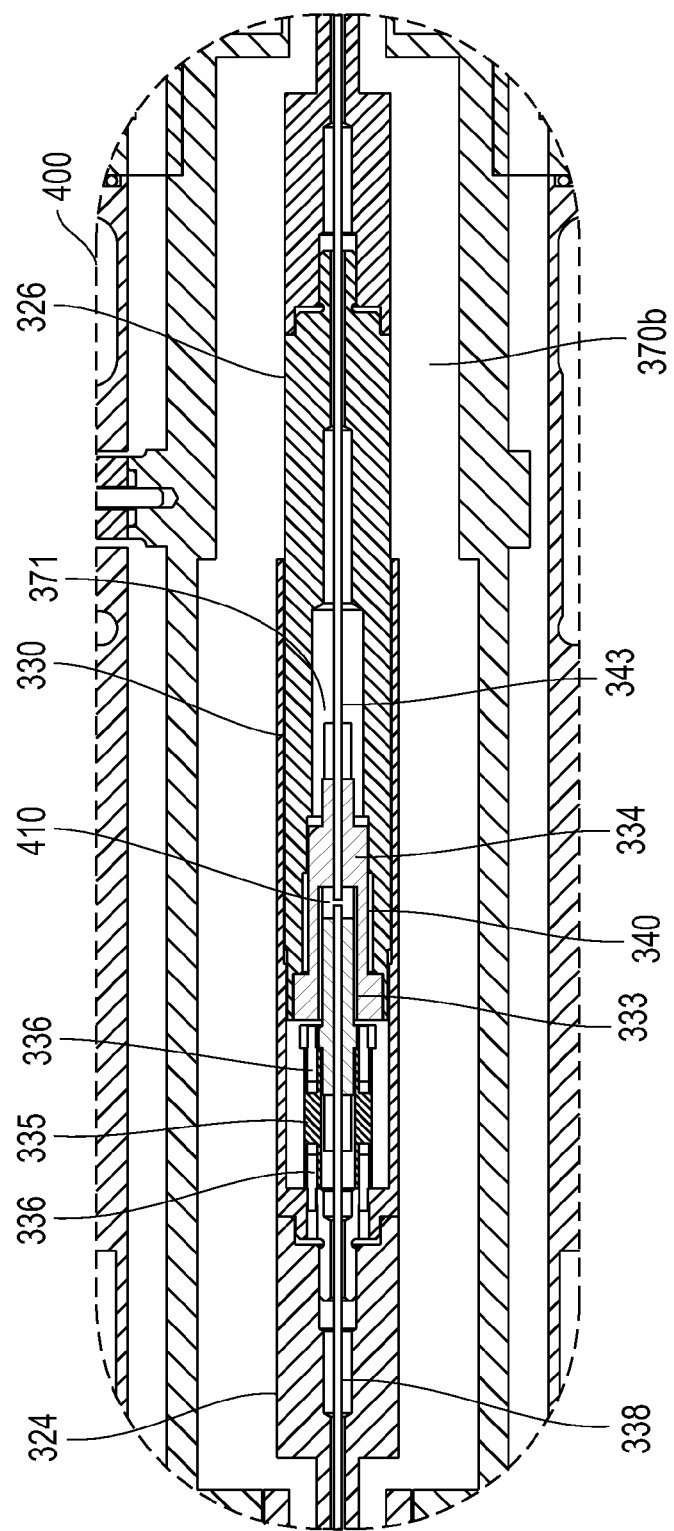
FIG. 4 illustrates a partial enlarged view from the embodiment of FIG. 3.

FIG. 4 illustrates a partial enlarged view 400 of innermost stepped impedance choke 330 of FIG. 3. The stepped impedance choke 330 is formed by close-fitting concentric cylindrical surfaces separated by a thin layer of dielectric material, i.e., between the inner surface of a cylindrical aperture defined within outer stationary conductor coupler portion 324 of the inner conductor of RF Channel 1 transmission line and a corresponding cylindrical outer surface of the inner rotating conductor coupler portion 326 of the inner conductor of RF Channel 1 transmission line. Also shown in FIG. 4 are stationary fiber optic conductor portion 338 and rotating fiber optic conductor portion 343 which are each received by an opposing end of a fiber optical rotary joint assembly 340 that includes mating stationary portion 333 and rotating portion 334, and that is positioned inside the inner conductor of the RF channel 1 transmission line as shown in FIG. 3. Specifically, stationary fiber optic conductor portion 338 is received in stationary portion 333 of fiber optical rotary joint assembly 340, and rotating fiber optic conductor portion 343 is received in rotating portion 334 of fiber optical rotary joint assembly 340 such that a terminal end of stationary fiber optic conductor portion 338 is oriented in axial end-to-end adjacent facing relationship with a terminal end of rotating fiber optic conductor portion 343 to create a rotational optical signal interface 410. This configuration allows transmission of optical signals either way across optical signal interface 410 between stationary fiber optic conductor portion 338 and rotating fiber optic conductor portion 343 at the same time that rotor portion 334 remains fixed or rotates together with rotating fiber optic conductor portion 343 relative to stator portion 333 and stationary fiber optic conductor portion 338.

It will be understood that the illustrated optical rotary joint assembly 340 is exemplary only, and that any other configuration or optical rotary joint assembly may be employed that is suitable for orienting and maintaining a terminal end of a stationary fiber optic conductor portion 338 in end-to-end adjacent facing relationship with a terminal end of a rotating fiber optic conductor portion 343 in order to create a rotational optical signal interface 410 across which optical signals may be transmitted between stationary fiber optic conductor portion 338 and rotating fiber optic conductor portion 343 at the same time that rotor portion 334 remains fixed or rotates together with rotating fiber optic conductor portion 343 relative to stator portion 333 and stationary fiber optic conductor portion 338. Examples of suitable optical rotary joints include, but are not limited to, fiber optical rotary joints available from Princetel of Hamilton, N.J.; Moog Components Group of Blacksburg, Va. and Halifax Nova Scotia, Canada; and Schleifring of Fürstenfeldbruck, Germany. In one particular exemplary embodiment, a Princetel MJX10 Single-Channel FORJ may be employed.

Figure 5:
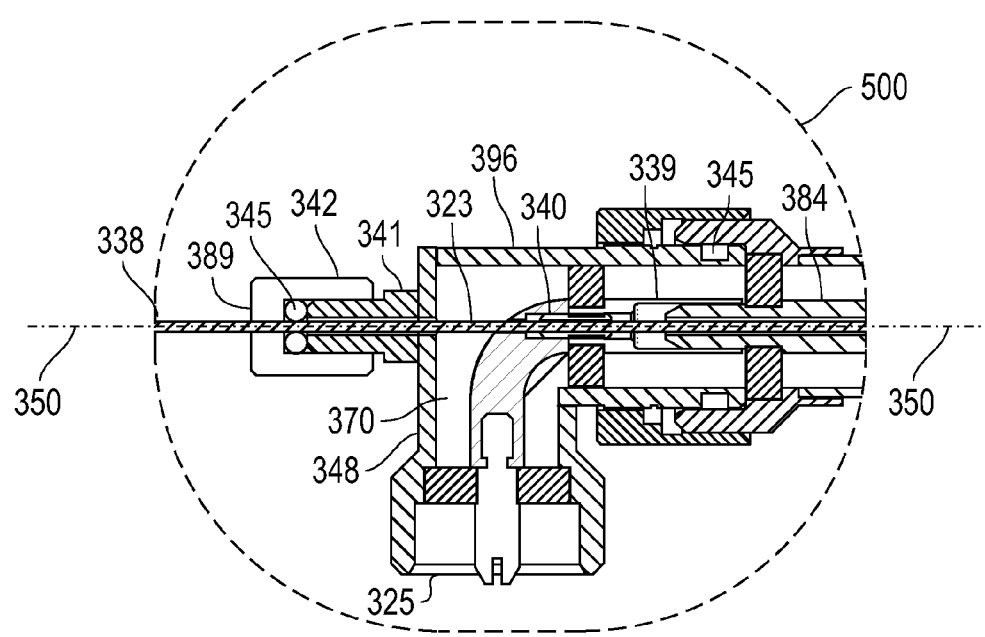
FIG. 5 illustrates a partial enlarged view from the embodiment of FIG. 3.

FIG. 5 illustrates a partial enlarged view 500 from FIG. 3 of one exemplary embodiment of stationary optical input 389 for stationary fiber optic conductor portion 338 that may be provided for the optical channel on stator portion 352 of rotary coupler 300. As shown in FIG. 5, the stationary fiber optic conductor portion 338 spans a gap 323 created between the stationary on-axis inner conductor portion 384 and stationary outer conductor 396 at an elbow 348 that is formed in the RF channel 1 transmission line and that is configured at 90 degrees relative to axis 350. However, it will be understood that a RF channel 1 transmission line may be configured at any other angle greater or less than 90 degrees relative to axis 350 that is suitable for providing an entry point and creating a gap or other configuration that provides an input for a stationary fiber optic conductor portion 338 into the stationary inner conductor 384 of the RF channel 1 transmission line. As shown, the fiber-optic line exits through the wall of outer conductor portion 396 and in this case is supported by a strain relief fitting 341 which may be sealed by, for example, a fixed environmental o-ring 345 seal which is held in place by a retainer cap 342. It will be understood that in other embodiments it is possible that stationary fiber optic conductor portion 338 may be additionally or alternatively oriented at an angle relative to axis 350 to provide a suitable entry point for fiber optic conductor portion 338 into the stationary inner conductor 384 of the RF channel 1 transmission line.

Figure 6:
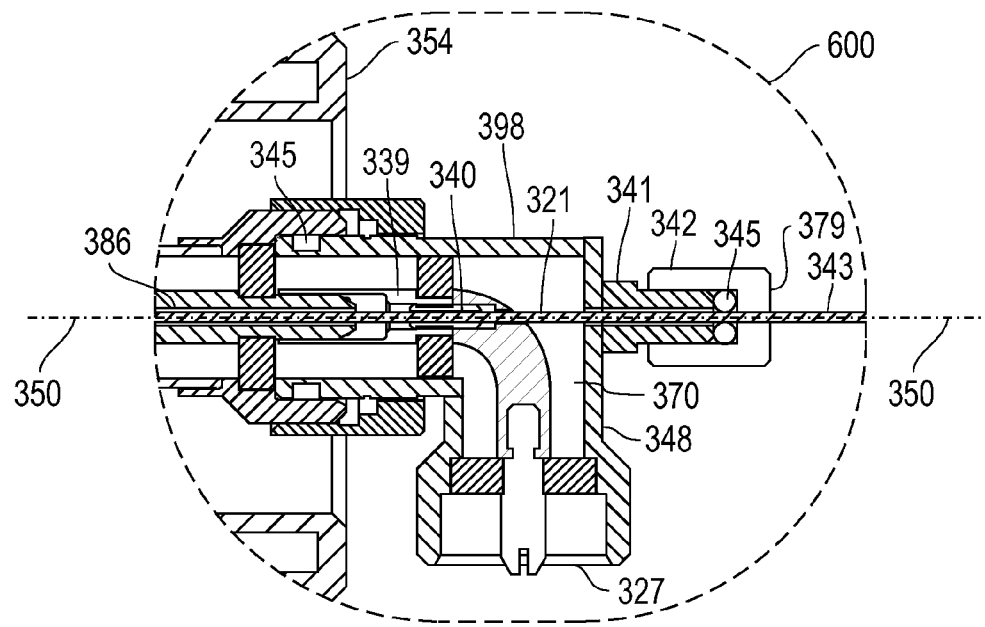
FIG. 6 illustrates a partial enlarged view from the embodiment of FIG. 3.

FIG. 6 illustrates a partial enlarged view 600 from FIG. 3 of one exemplary embodiment of rotating optical output 379 for rotating fiber optic conductor portion 343 that may be provided for the optical channel on rotor portion 354 of rotary coupler 300. As shown in FIG. 6, the rotating fiber optic conductor portion 343 spans a gap 321 created between the rotating on-axis inner conductor portion 386 and rotating outer conductor 398 at an elbow 348 that is formed in the RF Channel 1 transmission line and that is configured at 90 degrees relative to axis 350. However, it will be understood that a RF Channel 1 transmission line may be configured at any other angle greater or less than 90 degrees relative to axis 350 that is suitable for providing an entry point and creating a gap or other configuration that provides an input for a rotating fiber optic conductor portion 343 into the rotating inner conductor 386 of the RF Channel 1 transmission line. As shown, the fiber-optic line exits through the wall of outer conductor portion 398 and in this case is supported by a strain relief fitting 341 which may be sealed by, for example, an o-ring 345 which is held in place by a retainer cap 342. It will be understood that in other embodiments it is possible that rotating fiber optic conductor portion 343 may be additionally or alternatively oriented at an angle relative to axis 350 to provide a suitable entry point for rotating fiber optic conductor portion 343 into the rotating inner conductor 386 of the RF Channel 1 transmission line.

Figure 7:
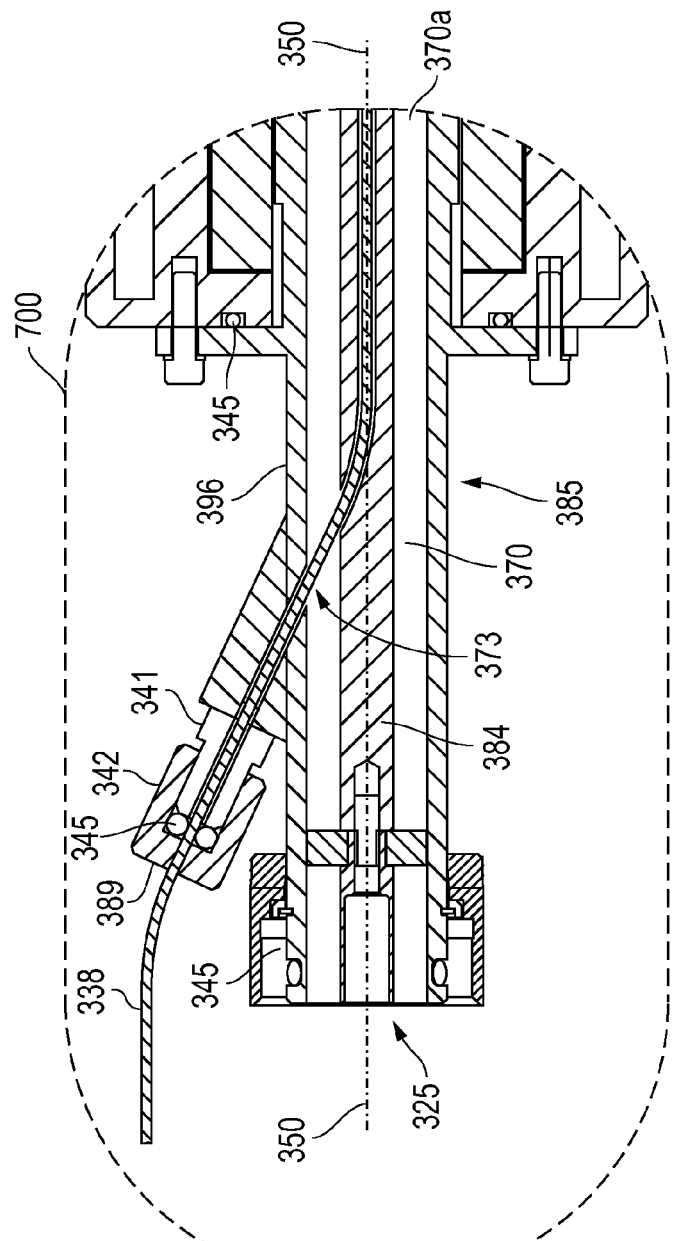
FIG. 7 illustrates a partial enlarged view of stationary optical input according to one exemplary embodiment of the disclosed systems and methods.

FIG. 7 illustrates an alternative embodiment 700 of a stationary optical input 389 for stationary fiber optic conductor portion 338 that may be provided for the optical channel on stator portion 352 of rotary coupler 300. In this exemplary embodiment, stationary fiber optic conductor portion 338 is angled or oriented by an angle of about 25 degrees (e.g., by an angle of about 20 to about 45 degrees in another exemplary embodiment) relative to the RF conductor portions 384 and 396 of the RF transmission line to span a gap 373 created between the outer stationary conductor portion 396 and the stationary on-axis inner conductor portion 384 of the RF channel 1 transmission line at a straight section 385 of the conductors 384 and 396 of the transmission line. Although not illustrated, it will be understood that a rotating optical output 379 may be similarly provided and configured for the optical channel on rotor portion 354 of rotary coupler 300.

Figure 8:
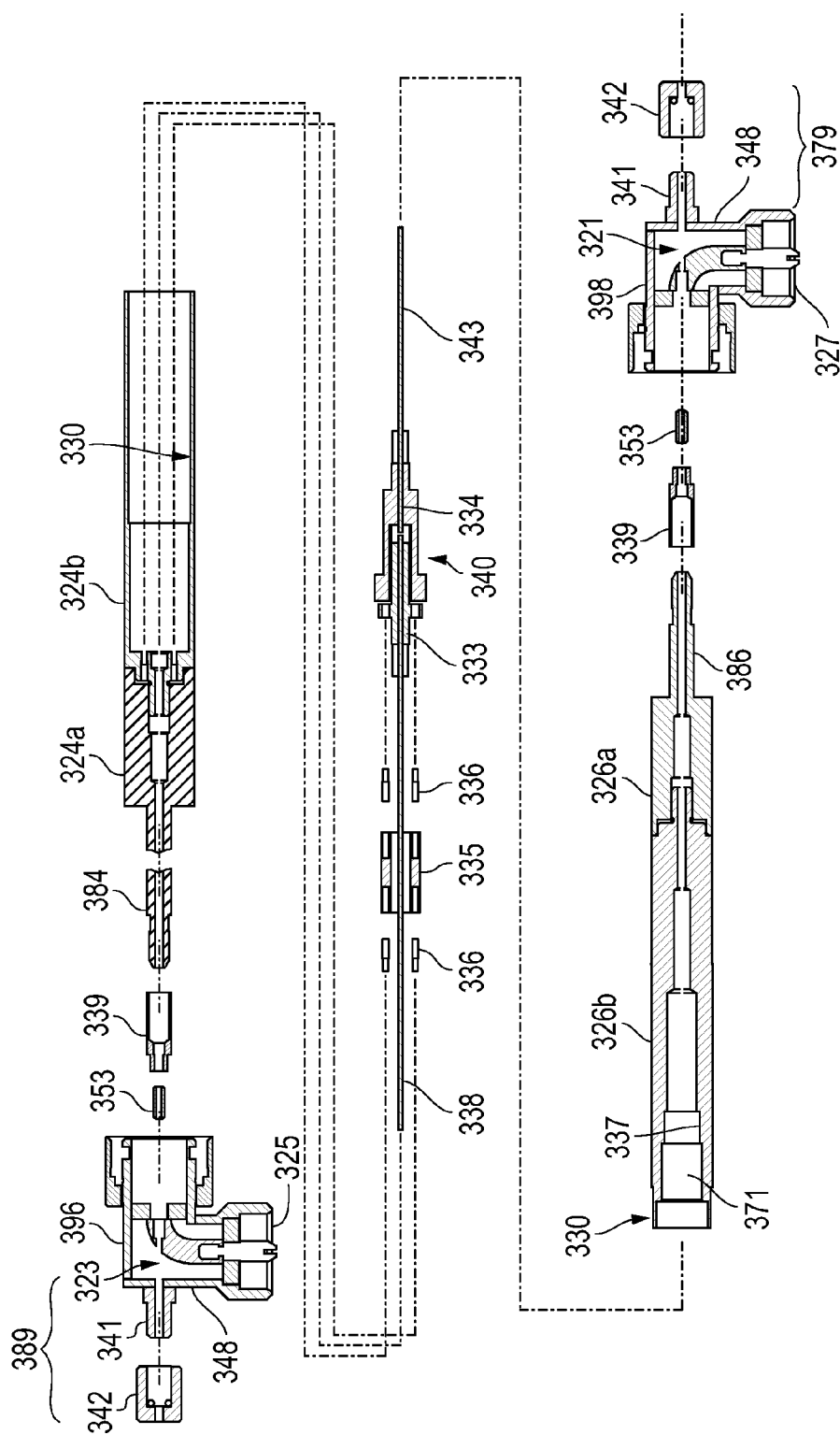
FIG. 8 illustrates a partial exploded cross-sectional view of components of the embodiment of FIG. 3.
Figure 10:
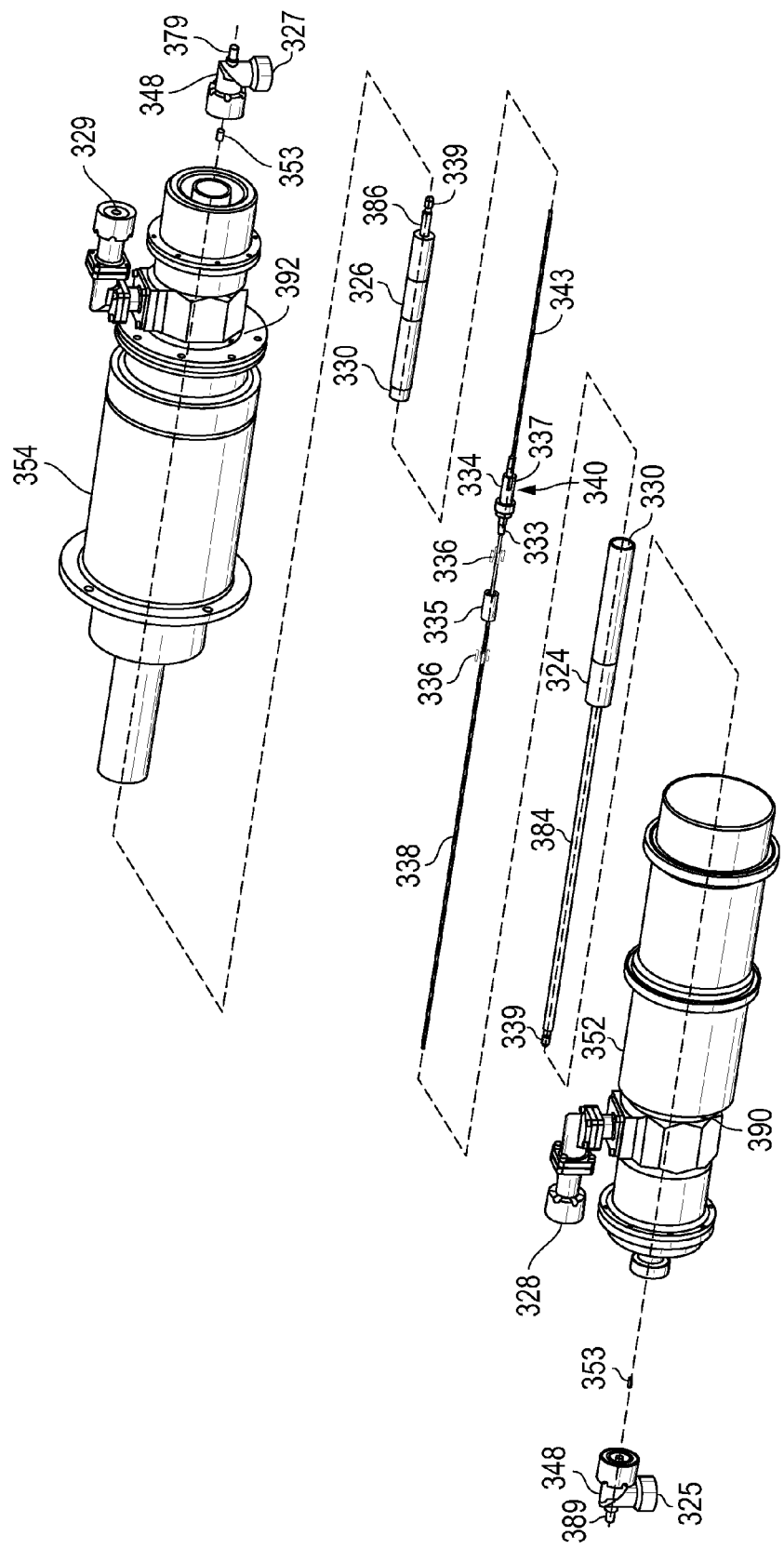
FIG. 10 illustrates an exploded perspective view of the embodiment of FIG. 3.

FIG. 8 illustrates an exploded cross-sectional view of components of the inner RF conductor of the on-axis RF channel 1 (including RF conductor portions 324 and 326), components of the optical conductor of the on-axis optical channel (including optical conductor portions 338 and 343) and components of the fiber optical rotary joint assembly 340 (including mating stationary portion 333 and rotating portion 334 of the fiber optical rotary joint assembly 340). For further reference, FIG. 10 is an exploded perspective view of the optical rotary coupler assembly 300 of FIG. 3. Referring now to FIGS. 3, 4, 8 and 10, fiber optical rotary joint assembly 340 is dimensioned to be received and positioned inside a mating aperture 371 defined within the rotating on-axis inner conductor coupler portion 326 of the RF channel 1 transmission line adjacent (or within or surrounded by) the stepped impedance choke 330 formed between the stationary on-axis inner conductor coupler portion 324 and rotating on-axis inner conductor coupler portion 326 of the inner conductor of the RF channel 1 transmission line. As further shown stationary RF conductor coupler portion 324 may be configured to have any length suitable for extending between choke 330 and socket fitting 339 that provides a coupled RF signal path between choke 330 and stationary RF input 325, and rotating RF conductor coupler portion 326 may be configured to have any length suitable for extending between choke 330 and socket fitting 339 that provides a coupled RF signal path between choke 330 and rotating RF output 327.

As shown, an axially-oriented aperture is defined to extend longitudinally through the stationary portion 333 of fiber optical rotary joint assembly 340 and is dimensioned and configured to receive stationary fiber optic conductor portion 338 in a fixed relationship relative to stationary portion 333. Similarly, an axially-oriented aperture is defined to extend longitudinally through the rotating portion 334 of the fiber optical rotary joint assembly 340 and is dimensioned and configured to receive the rotating fiber optic conductor portion 343 in fixed relationship relative to the rotating portion 334. As shown, when stationary portion 333 of fiber optical rotary joint assembly 340 is assembled with stationary fiber optic conductor portion 338 and concentrically mated with rotating portion 334 of the fiber optical rotary joint assembly 340 that is assembled with rotating fiber optic conductor portion 343, optical conductor portions 338 and 343 are held in close axially aligned relationship with each other such that the terminal end of stationary fiber optic conductor portion 338 is positioned in axial end-to-end adjacent facing relationship with the terminal end of rotating fiber optic conductor portion 343 to create a rotational optical signal interface 410. This configuration allows transmission of optical signals across optical signal interface 410 between stationary fiber optic conductor portion 338 and rotating fiber optic conductor portion 343 at the same time that rotor portion 354 of rotary coupler 300 rotates together with rotating fiber optic conductor portion 343 relative to stator portion 352 of rotary coupler 300 and stationary fiber optic conductor portion 338.

As previously described, the stationary fiber optic conductor portion 338 spans a gap 323 created between the stationary on-axis inner conductor portion 384 and stationary outer conductor portion 396 of the RF channel 1 transmission line, and the rotating fiber optic conductor portion 343 spans a gap 321 created between the rotating on-axis inner conductor portion 386 and rotating outer conductor portion 398 of the RF channel 1 transmission line.

In the illustrated embodiment, the stationary portion 333 of fiber optical rotary joint assembly 340 may be prevented from rotating relative to stationary on-axis inner conductor coupler portion 324 of the RF channel 1 transmission line by virtue of a mechanical interference fit between these components, or by using any other suitable mechanical assembly or configuration for holding these two components in a fixed position relative to each other. At the same time electrical insulation may be maintained between the stationary on-axis inner conductor coupler portion 324 and rotating on-axis inner conductor coupler portion 326 of the inner conductor of the RF channel 1 transmission line by an anti-torque guide ring 335 of rigid dielectric material (e.g., such as polytetrafluoroethylene (PTFE or Teflon) or other suitable dielectric material) disposed therebetween, and by using close-fitting anti-torque pins 336 which in this exemplary embodiment serve the purpose of proving a mechanical couple between stationary on-axis inner conductor coupler portion 324 to anti-torque guide ring 335 to stationary portion 333 of fiber optical rotary joint assembly 340 for holding these three components in a fixed position relative to each other. Anti-torque guide ring 335 may further be constrained from rotation relative to the stationary on-axis inner conductor coupler portion 324 by frictional contact, and may thus serve to provide a mechanical interference fit between the stationary portion 333 of fiber optical rotary joint assembly 340 and stationary on-axis inner conductor coupler portion 324 of the RF channel 1 transmission line to prevent these components from rotating relative to each other. In this particular embodiment, the rotating portion 334 of the fiber optical rotary joint assembly 340 may be prevented from rotating relative to the rotating on-axis inner conductor coupler portion 326 of the RF channel 1 transmission line by virtue of mating close fitting flat surfaces 337 of fiber optical rotary joint assembly 340 and flat surfaces 337 of rotating on-axis inner conductor coupler portion 326, or by using any other suitable mechanical assembly or configuration for holding these two components in a fixed position relative to each other.

It will be understood that any suitable assembly or configuration of components may be employed to provide a stationary optical input for a stationary fiber optic conductor portion 338, and to provide a rotating optical output for a rotating fiber optic conductor portion 343. For example, in the particular exemplary embodiment of FIG. 8 stationary fiber optic conductor portion 338 may pass through the following components from the interior of rotary coupler 300 to the exterior environment: stationary on-axis inner conductor portion 384, socket fitting 339, drilled set screw 353, and sealed strain-relief fitting 341 and feed-through seal cover 342 in the form of "pig tail" cable configuration where the end of 338 is terminated with a suitable fiber optic connector type. Similarly, in the exemplary embodiment of FIG. 8, rotating fiber optic conductor portion 343 may pass through the following components from the interior of rotary coupler 300 to the exterior environment: rotating on-axis inner conductor portion 386 of the RF channel 1 transmission line, socket fitting 339, set screw 353, sealed fiber optic feed through strain-relief fitting 341, and feed-through seal cover 342 in the form of "pig tail" cable configuration where the end of 343 is terminated with a suitable fiber optic connector type. It will be understood that these particular combinations of fiber optic conductor input and output components are exemplary only and that any other combination of components may be employed.

Thus, as shown in the illustrated embodiments, one or more components of an optical rotary joint may be provided within the on-axis inner (center) conductor portions of a RF channel of a rotary coupler for supporting a on-axis optical signal channel conductor (fiber optic line) inside the on-axis inner RF conductor portions of the rotary coupler to allow for simultaneous transmission of RF and optical signals across rotational interfaces between rotor and stator portions of the rotary coupler either during rotary coupler rotation or while the rotary coupler rotor and stator components are fixed relative to each other. A stationary portion of the optical rotary joint may be configured to receive a stationary fiber optic conductor portion that is fixed to the stator side of the rotary coupler and a mating rotation portion of the optical rotary joint may be configured to receive a rotating fiber optic conductor portion that is fixed to the rotor side of the rotary coupler. The stationary portion of the optical rotary joint may be fixedly coupled to the stator portion of the rotary coupler, and a mating rotating portion of the optical rotary joint may be fixedly coupled to the rotor portion of the optical rotary joint. Optical inputs and/or outputs for the optical channel conductors may be provided relative to the inner RF conductors on each of the rotor or stator sides of the rotary coupler, e.g., by angling either one or both of the inner RF conductor or optical signal channel conductor relative to the central axis of the rotary coupler (and relative to each other) such that the optical signal channel conductor passes through a wall or other surface of the inner RF conductor to allow the optical fiber to transition from inside the inner RF conductor to a position outside the outer RF conductor.

Figure 11:
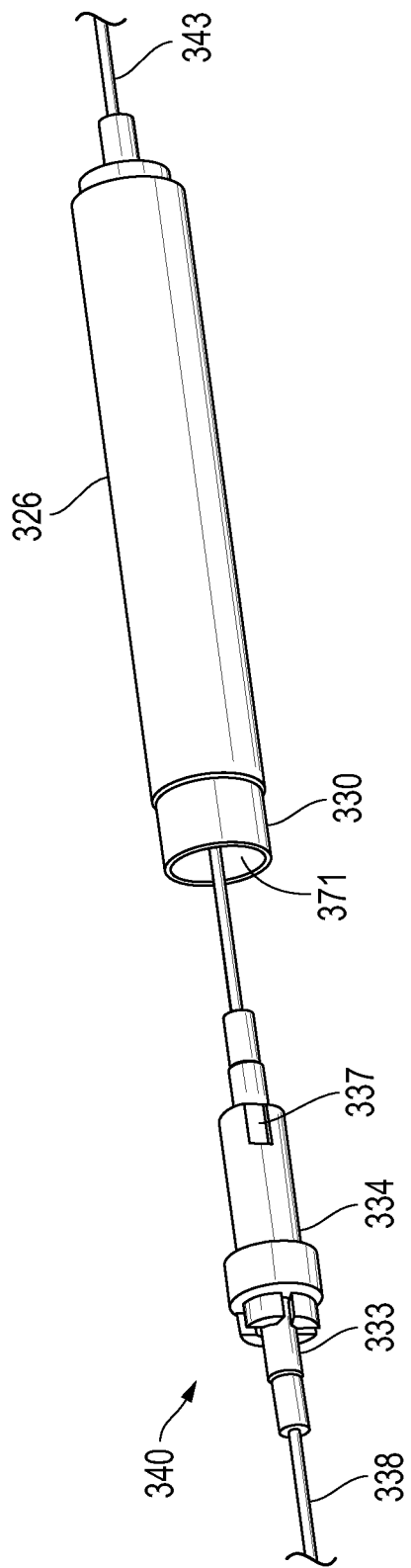
FIG. 11 illustrates an exploded perspective view of an optical rotary joint assembly coupled to stationary fiber optic conductor portion and rotating fiber optic conductor portion according to one exemplary embodiment of the disclosed systems and methods.

FIG. 11 illustrates an exploded perspective view of a optical rotary joint assembly 340 coupled to stationary fiber optic conductor portion 338 (e.g., single or multiple mode fiber optic conductor) and rotating fiber optic conductor portion 343, and that is positioned for insertion into mating aperture 371 defined within an inner channel coupler component 326 of the rotating on-axis inner conductor portion 386 of the RF channel 1 transmission line. As shown flat sides 337 are provided on the outer surface of rotating portion 334 of rotary joint assembly 340 to provide a rectangular-shaped profile which is configured to be received by a corresponding shaped square profile having two mating flat surfaces within aperture 371 that prevent components 334 and 326 from rotating relative to each other when they are assembled together as shown in FIG. 12.

Figure 12:
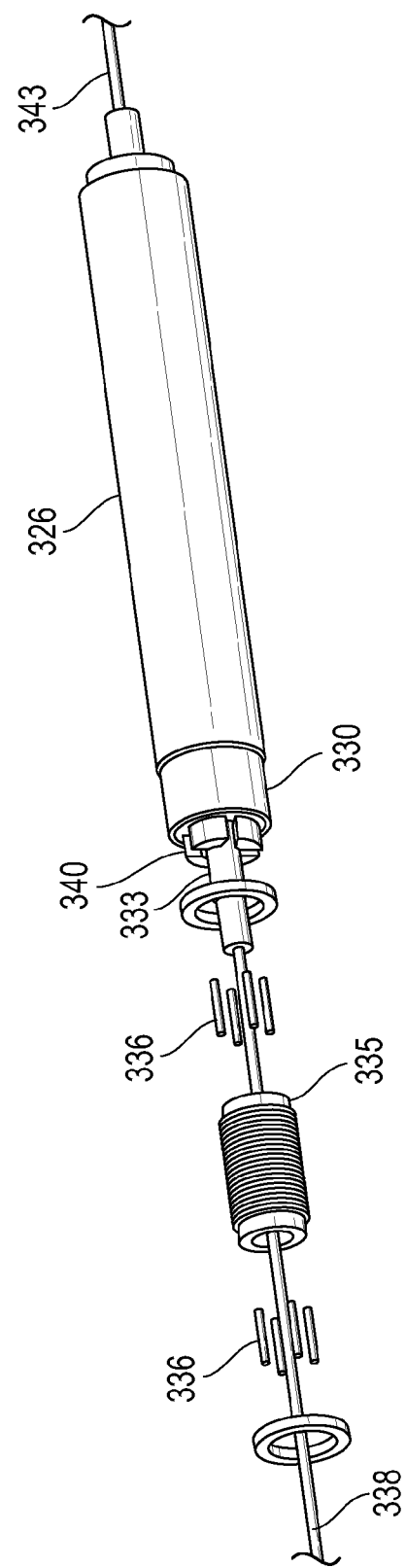
FIG. 12 illustrates an exploded perspective view of an optical rotary joint assembly and rotating on-axis inner conductor coupler portion according to one exemplary embodiment of the disclosed systems and methods.
Figure 13:
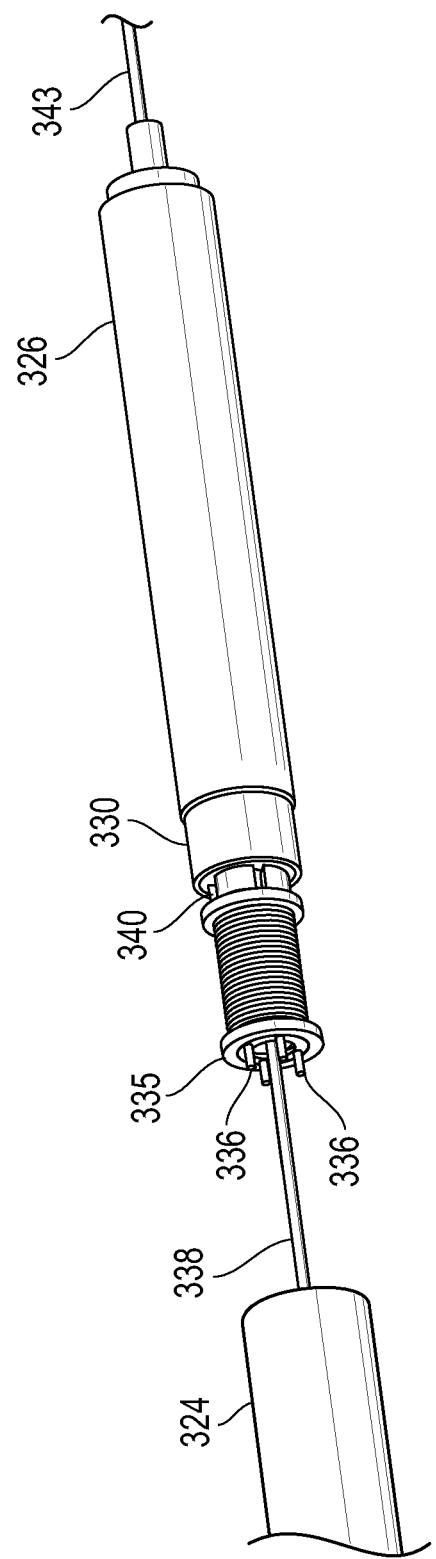
FIG. 13 illustrates an exploded perspective view of an optical rotary joint assembly, rotating on-axis inner conductor coupler portion, and stationary on-axis inner conductor coupler portion according to one exemplary embodiment of the disclosed systems and methods.

FIG. 12 illustrates the inner channel coupler component 326 of the rotating on-axis inner conductor portion 386 assembled around the rotary joint assembly 340 and fiber optic conductor portions 338 and 343. FIG. 12 also shows dielectric guide ring 335 held in place between inner channel coupler component 326 of the rotating on-axis inner conductor portion 386 and outer channel coupler component of the stationary on-axis inner conductor coupler portion 324 by guide pins 336 (e.g., stainless steel or other suitable material pins) that are dimensioned to be received in corresponding openings in each sides of dielectric guide ring 335, stationary portion 333 of rotary joint assembly 340, and outer channel coupler component of the stationary on-axis inner conductor coupler portion 324 to interlink these components in fixed relationship when assembled together as shown in FIGS. 13 and 14.

Figure 14:
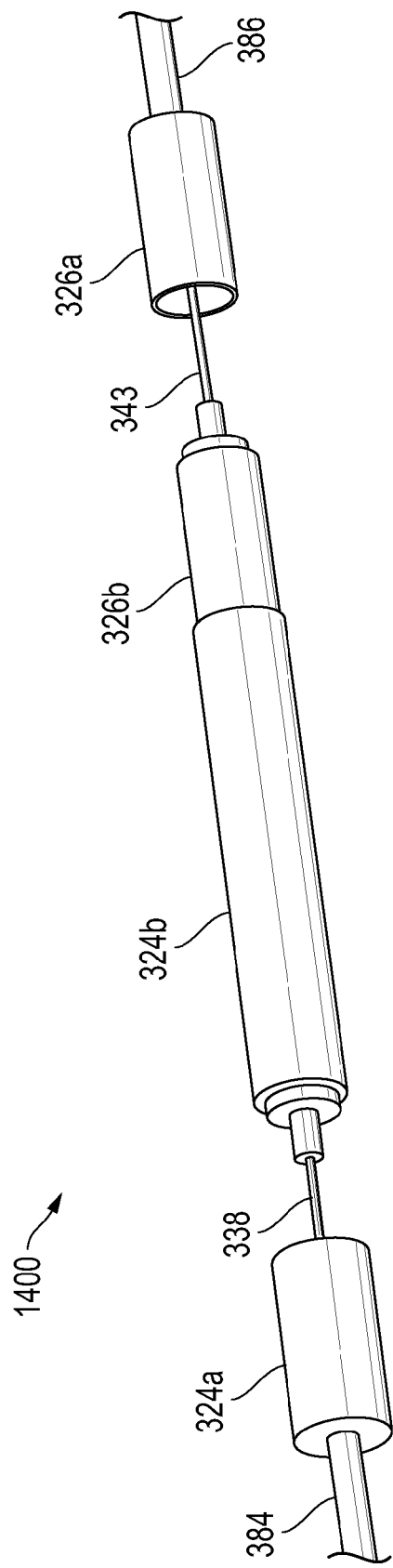
FIG. 14 illustrates an exploded perspective view of an assembled optical rotary joint assembly, rotating on-axis inner conductor coupler portion, and stationary on-axis inner conductor coupler portion according to one exemplary embodiment of the disclosed systems and methods.

FIG. 14 shows mating portions of stationary on-axis inner conductor coupler portion 324b and rotating on-axis inner conductor coupler portion 326b aligned and configured for coupling to corresponding stationary inner channel coupler component 324a and inner channel coupler component 326a, respectively, to complete the assembly of the inner conductor of the RF channel 1 transmission line which is dimensionally configured to be contained within cavity 370b of rotary coupler 300.

Figure 15:
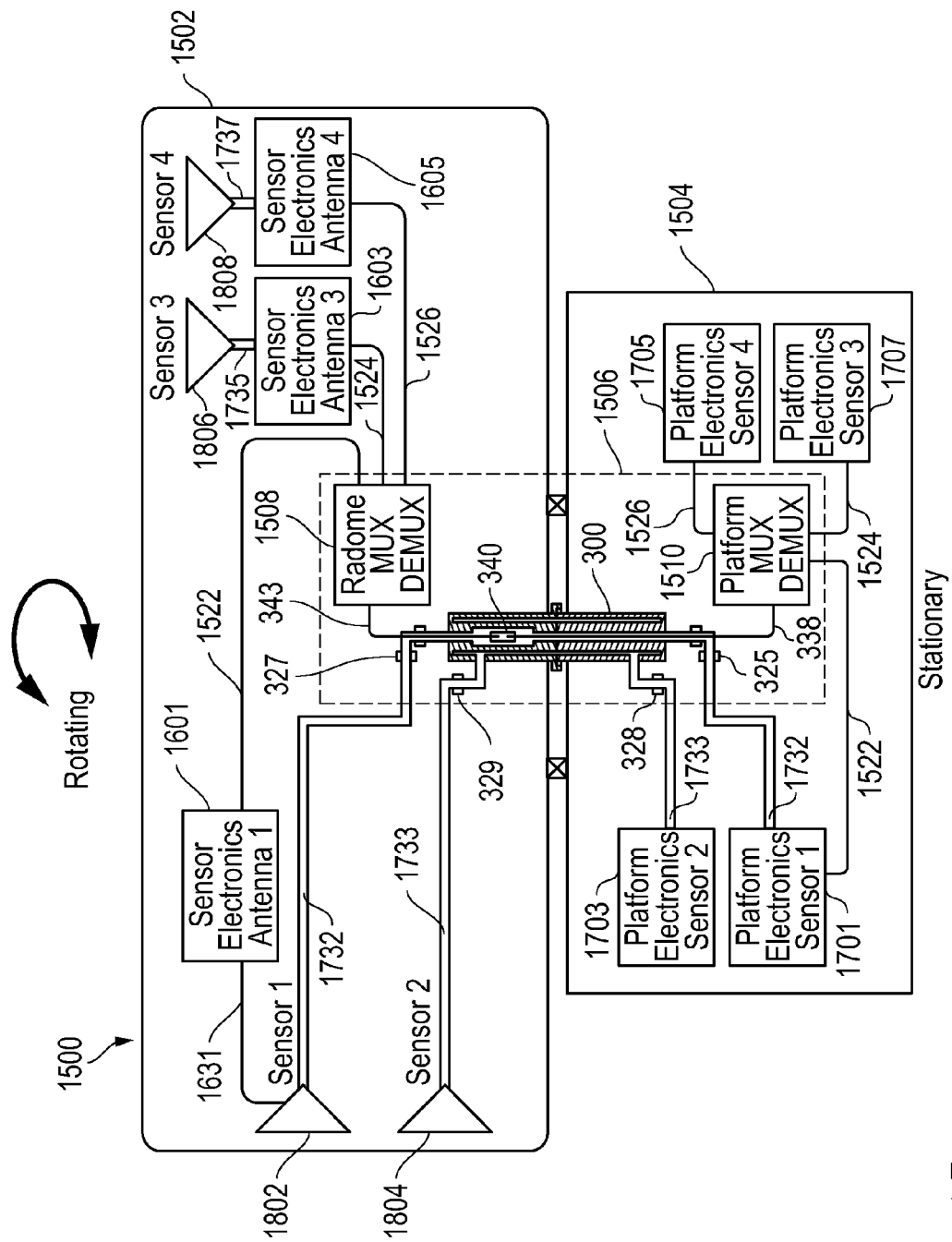
FIG. 15 illustrates a simplified block diagram of optical signal communication components and electronic components of a rotary antenna array system according to one exemplary embodiment of the disclosed systems and methods.

FIG. 15 illustrates a simplified block diagram of one exemplary embodiment of optical signal communication components 1506 together with other exemplary electronic components of a rotary sensor system configured in this case as a rotary antenna array system 1500. As shown in FIG. 15, a suite of sensors 1802, 1804,1806 and 1808 (e.g., antenna element assemblies configured for different designated RF sensing tasks, or alternatively for electro-optic, infrared, etc. sensors) may be deployed within open space within a rotating sensor assembly 1502. In this exemplary embodiment, rotating sensor assembly 1502 is described as a radome, however it will be understood that the disclosed systems and methods may be implemented with any other type of rotating sensor assemblies including rotating sensor assemblies that are not enclosed. The RF output and/or input for sensors 1802 and 1804 is passed through RF Rotary Coupler 300 with RF interface to connectors 327 and 329 housed within the radome 1502. Also shown in FIG. 15 are components of a system support platform 1504 (e.g., mobile vehicular platform such as aircraft, ship, train, automobile, spacecraft; fixed land installation such as radar station or satellite station or control tower; etc.) that is disposed in stationary (non-rotating) relationship relative to radome 1502.

As shown in FIG. 15, system support platform 1504 of this embodiment includes platform-side sensor electronics 1701, 1703, 1705, and 1707; and platform-side optical signal communication electronics 1510. In this exemplary embodiment, platform-side sensor electronics 1701 and 1703 interface to the RF Rotary Coupler 300 for exchanging RF signals 1732 and 1733 with RF sensors 1802 and 1804 via respective RF input/outputs 325/327 and 328/329. Also as illustrated in FIG. 15, optical control data 1522 is generated by platform-side sensor electronics 1701 for sensor 1 (1802) and is passed through platform MUX/DEMUX circuitry 1510 and optical rotary joint 340 of signal communication components 1506 to Radome MUX/DEMUX circuitry 1508 and sensor assembly-side electronics 1601 for sensor 1 (1802). In this exemplary embodiment, electronics 1601 is configured to provide control signals 1631 to control the pointing position for the main beam of Sensor 1 (1802) based on the received optical control signals 1522.

Still referring to FIG. 15, the sensor output and/or input signals 1735 and 1737 of the given sensors 1806 and 1808 of radome 1502 may be coupled to other interfacing electronic circuit components 1603 and 1605 that may include media converter circuitry (e.g., photonics link, Ethernet, RS422, etc.) that is configured to convert between electron-based signals (e.g., RF signal or other signal format such as video signals, audio signals, control signals, data signals, computer network signals, etc.) of each radome sensor 1806 and 1808 or other type of electronic circuitry and the corresponding optical photon-based optical signals 1524 and 1526 that are exchanged with radome MUX/DEMUX circuitry 1508 as shown. Radome MUX/DEMUX circuitry 1508 is in turn coupled to multiplex/demultiplex and exchange (e.g., transmit and/or receive) multiplexed optical signals corresponding to the optical control signals 1522 and optical sensor signals 1524, 1526 corresponding to the various different sensors 1802, 1806 and 1808 and/or other radome electronics with platform MUX/DEMUX circuitry 1510 across optical rotary joint assembly 340 of rotary coupler 300 via respective rotating and stationary optical conductor portions 343 and 338. In this regard, different optical signals may be multiplexed for simultaneous communication across single or multi mode fiber conductors 343 and 338 in any suitable manner including, but not limited to, using wavelength division multiplexing (WDM). Interfacing electronic components 1603 and 1605 may be employed to accept sensor data from sensors 1806 and 1808 in a variety of different type formats (e.g., Ethernet, serial data, video data, RF by a photonics link, etc.) and convert and communicate the data of these sensor signals as photon-based optical signals 1524 and 1526 to radome MUX/DEMUX circuitry 1508.

As further shown in FIG. 15, platform MUX/DEMUX circuitry 1510 is provided in communication with optical rotary joint assembly 340 and is coupled to exchange multiplexed optical signals to and/or from radome MUX/DEMUX circuitry 1508 across optical rotary joint assembly 340. Platform MUX/DEMUX circuitry 1510 is also coupled to multiplex, demultiplex, and exchange individual optical signals 1522, 1524 and 1526 corresponding to platform-side sensor electronics 1701, 1705, and 1707 as illustrated in FIG. 15. Examples of platform-side sensor electronics 1701, 1705, and 1707 that may be employed to communicate with sensors 1802, 1806 and 1808 via platform MUX/DEMUX circuitry 1510 and radome MUX/DEMUX circuitry 1508 include, but are not limited to, receivers, controllers, drivers and/or processers for sensors 1802, 1806 and 1808.

It will be understood that the embodiment of FIG. 15 is exemplary only, and that any other configuration and/or type of optical communication and other electronic components may be provided within a radome and/or platform of a rotary antenna array system 1500, and further that non-multiplexed optical signals (e.g., from and/or to a single optical signal electronic circuit communication component) may alternatively be communicated across an optical rotary joint assembly 340 of a rotary antenna array system 1500 or other type of assembly that employs a rotary coupler assembly 300 as described herein.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:
1. A rotary sensor system, comprising:
rotatable system components including rotatable sensor electronics, at least one rotatable RF sensor, and at least one rotatable optical signal communication component;
stationary system components including stationary RF sensor electronics for the at least one rotatable RF sensor, and at least one stationary optical signal communication component; and
a rotary coupler coupled between the stationary system components and the rotatable system components, the rotary coupler having a stator portion rotatably coupled to a rotor portion, the stator portion being coupled between the stationary system components and the rotor portion, and the rotor portion being coupled between the rotatable system components and the stator portion such that the rotor portion rotates together with the rotatable system components relative to the stator portion and the stationary system components;
where the stator portion includes a stationary RF conductor portion of a center RF transmission line;
where the rotor portion includes a rotatable RF conductor portion of the center RF transmission line, the rotor portion being configured to rotate about a rotational axis relative to the stator portion;
where the stationary RF conductor portion and the rotatable RF conductor portion of the center RF transmission line are disposed in adjacent rotatable relationship to form a first part of a center RF signal channel that extends across a rotational RF signal interface defined between the stationary RF conductor portion and the rotatable RF conductor portion of the center RF transmission line to couple the at least one rotatable RF sensor in RF signal communication with the stationary RF sensor electronics;
where the stator portion further comprises a stationary optical conductor portion of an optical transmission line, and where the rotor portion further comprises a rotatable optical conductor portion of the optical transmission line;
where the stationary optical conductor portion and the rotatable optical conductor portion are disposed in adjacent rotatable relationship to form an on-axis optical signal channel coincident with the rotational axis of the rotor portion and extending across a rotational optical signal interface defined between the stationary optical conductor portion and the rotatable optical conductor portion to couple the at least one stationary optical signal communication component in optical signal communication with at least one rotatable optical signal communication component; and where the rotational optical signal interface is disposed within the center RF transmission line.

2. The rotary sensor system of claim 1, further comprising:
a rotatable sensor assembly configured as a radome that houses at least a portion of the rotatable system components, the rotatable sensor assembly being coupled to rotate with the rotor portion of the rotary coupler; and
a system support platform supporting at least portion of the stationary system components thereon, the system support platform being coupled to remain stationary with the stator portion of the rotary coupler.

3. The rotary sensor system of claim 2, where the system support platform is a mobile system support platform; and where the rotatable sensor assembly is a rotatable sensor array.

4. The rotary sensor system of claim 3, where the system support platform is an aircraft.

5. The rotary sensor system of claim 1, further comprising:
an optical rotary joint disposed within the center RF transmission line of the rotary coupler;
where the stationary optical conductor portion comprises a stationary fiber optic portion;
where the rotatable optical conductor portion comprises a rotatable fiber optic portion;
where a terminal end of the stationary fiber optic conductor portion is positioned in axial end-to-end adjacent facing relationship with a terminal end of the rotatable fiber optic conductor portion within the optical rotary joint to form the rotational optical signal interface within the optical rotary joint between the stationary fiber conductor portion and the rotatable fiber optic conductor portion; and
where the rotational optical signal interface is configured to pass optical signals between the stationary optical conductor portion and the rotatable optical conductor portion to communicate optical signals between the at least one stationary optical signal communication component and the at least one rotatable optical signal communication component while the rotatable sensor assembly and rotor portion of the rotary coupler are both stationary and rotating relative to the system support platform and stator portion of the rotary coupler.

6. The rotary sensor system of claim 5, where:
the stationary optical conductor portion and the rotatable optical conductor portion of the rotary coupler comprise respective optical fiber conductors that are disposed in adjacent rotatable relationship to form an on-axis optical signal channel;
the rotatable system components comprise multiple optical signal sources coupled to the rotatable optical signal communication component;
the rotatable optical signal communication component comprises optical multiplexer and demultiplexer circuitry coupled between the multiple optical signal sources and the rotatable optical conductor portion of the on-axis optical signal channel;
the stationary system components comprise multiple stationary sensor electronic components coupled to the rotatable optical signal communication component;
the stationary optical signal communication component comprises optical multiplexer and demultiplexer circuitry coupled between the multiple stationary sensor electronic components and the rotatable optical conductor portion of the on-axis optical signal channel; and
the rotatable optical multiplexer and demultiplexer circuitry and the stationary optical multiplexer and demultiplexer circuitry are configured to cooperate to multiplex and demultiplex individual optical signals so as to simultaneously exchange individual optical signals across the on-axis optical signal channel between respective individual rotatable optical signal sources and corresponding stationary sensor electronic components while the rotatable sensor assembly and rotor portion of the rotary coupler are both stationary and rotating relative to the system support platform and stator portion of the rotary coupler.

7. The rotary sensor system of claim 5, where the stator portion further comprises a stationary RF conductor portion of a first concentric RF transmission line that is concentrically disposed around the center RF transmission line;
where the rotor portion further comprises a rotatable RF conductor portion of a first concentric RF transmission line that is concentrically disposed around the center RF transmission line;
where the stationary RF conductor portion and the rotatable RF conductor portion of the first concentric RF transmission line are disposed in adjacent rotatable relationship to form a second part of the center RF signal channel that extends across a rotational RF signal interface defined between the stationary RF conductor portion and the rotatable RF conductor portion of the first concentric RF transmission line to couple the at least one rotatable RF sensor in RF signal communication with the stationary RF sensor electronics;
where the stationary RF conductor portion of the center RF transmission line further comprises a stationary center conductor coupler portion; and
where the rotatable RF conductor portion of the center RF transmission line further comprises a rotatable center conductor coupler portion received in rotatable concentric relationship with the stationary center conductor coupler portion to form the rotational RF signal interface of the center RF transmission line between concentric-fitting surfaces of the stationary RF conductor portion and the rotatable RF conductor portion of the center RF transmission line, the rotational RF signal interface being formed around the optical rotary joint.

8. The rotary sensor system of claim 7, where:
the stationary optical conductor portion and the rotatable optical conductor portion of the rotary coupler comprise respective optical fiber conductors that are disposed in adjacent rotatable relationship to form an on-axis optical signal channel;
the rotatable system components comprise multiple optical signal sources coupled to the rotatable optical signal communication component;
the rotatable optical signal communication component comprises optical multiplexer and demultiplexer circuitry coupled between the multiple optical signal sources and the rotatable optical conductor portion of the on-axis optical signal channel;
the stationary system components comprise multiple stationary sensor electronic components coupled to the rotatable optical signal communication component;
the stationary optical signal communication component comprises optical multiplexer and demultiplexer circuitry coupled between the multiple stationary sensor electronic components and the rotatable optical conductor portion of the on-axis optical signal channel; and
the rotatable optical multiplexer and demultiplexer circuitry and the stationary optical multiplexer and demultiplexer circuitry are configured to cooperate to multiplex and demultiplex individual optical signals so as to simultaneously exchange individual optical signals across the on-axis optical signal channel between respective individual rotatable optical signal sources and corresponding stationary sensor electronic components.

9. The rotary sensor system of claim 7, where:
the rotatable system components further comprise at least one additional rotatable RF sensor, and the stationary system components further comprise stationary RF sensor electronics for the at least one additional rotatable RF sensor;
the stator portion further comprises a stationary RF conductor portion of a second concentric RF transmission line that is concentrically disposed around the first concentric RF transmission line;
the rotor portion further comprises a rotatable RF conductor portion of a second concentric RF transmission line that is concentrically disposed around the first concentric RF transmission line;
the stationary RF conductor portion and the rotatable RF conductor portion of the first concentric RF transmission line are disposed in adjacent rotatable relationship to form a first part of a concentric RF signal channel that extends across a rotational RF signal interface defined between the stationary RF conductor portion and the rotatable RF conductor portion of the first concentric RF transmission line to couple the at least one additional rotatable RF sensor in RF signal communication with the RF processing circuitry of the system support platform; and
the stationary RF conductor portion and the rotatable RF conductor portion of the second concentric RF transmission line are disposed in adjacent rotatable relationship to form a second part of the concentric RF signal channel that extends across a rotational RF signal interface defined between the stationary RF conductor portion and the rotatable RF conductor portion of the second concentric RF transmission line.

10. The rotary sensor system of claim 9, where:
the stationary optical conductor portion and the rotatable optical conductor portion of the rotary coupler comprise respective optical fiber conductors that are disposed in adjacent rotatable relationship to form an on-axis optical signal channel;
the rotatable system components comprise multiple optical signal sources coupled to the rotatable optical signal communication component;
the rotatable optical signal communication component comprises optical multiplexer and demultiplexer circuitry coupled between the multiple optical signal sources and the rotatable optical conductor portion of the on-axis optical signal channel;
the stationary system components comprise multiple stationary sensor electronic components coupled to the rotatable optical signal communication component;
the stationary optical signal communication component comprises optical multiplexer and demultiplexer circuitry coupled between the multiple stationary sensor electronic components and the rotatable optical conductor portion of the on-axis optical signal channel; and
the rotatable optical multiplexer and demultiplexer circuitry and the stationary optical multiplexer and demultiplexer circuitry are configured to cooperate to multiplex and demultiplex individual optical signals so as to simultaneously exchange individual optical signals across the on-axis optical signal channel between respective individual rotatable optical signal sources and corresponding stationary sensor electronic components.

11. A method of operating a rotary sensor system, comprising:
providing a rotary sensor system comprising:
rotatable system components including rotatable sensor electronics, at least one rotatable RF sensor, and at least one rotatable optical signal communication component,
stationary system components including stationary RF sensor electronics for the at least one rotatable RF sensor, and at least one stationary optical signal communication component, and
a rotary coupler coupled between the stationary system components and the rotatable system components, the rotary coupler having a stator portion rotatably coupled to a rotor portion, the stator portion being coupled between the stationary system components and the rotor portion, and the rotor portion being coupled between the rotatable system components and the stator portion such that the rotor portion rotates together with the rotatable system components relative to the stator portion and the stationary system components
where the stator portion includes a stationary RF conductor portion of a center RF transmission line,
where the rotor portion includes a rotatable RF conductor portion of the center RF transmission line, the rotor portion being configured to rotate about a rotational axis relative to the stator portion,
where the stationary RF conductor portion and the rotatable RF conductor portion of the center RF transmission line are disposed in adjacent rotatable relationship to form a first part of a center RF signal channel that extends across a rotational RF signal interface defined between the stationary RF conductor portion and the rotatable RF conductor portion of the center RF transmission line to couple the at least one rotatable RF sensor in RF signal communication with the stationary RF sensor electronics,
where the stator portion further comprises a stationary optical conductor portion of an optical transmission line, and where the rotor portion further comprises a rotatable optical conductor portion of the optical transmission line,
where the stationary optical conductor portion and the rotatable optical conductor portion are disposed in adjacent rotatable relationship to form an on-axis optical signal channel coincident with the rotational axis of the rotor portion and extending across a rotational optical signal interface defined between the stationary optical conductor portion and the rotatable optical conductor portion to couple the at least one stationary optical signal communication component in optical signal communication with at least one rotatable optical signal communication component, and
where the rotational optical signal interface is disposed within the center RF transmission line; and
where the method further comprises communicating optical signals between the at least one stationary optical signal communication component and the at least one rotatable optical signal communication component across the rotational optical signal interface.

12. The method of claim 11, where the rotary system further comprises a rotatable sensor assembly configured as a radome that houses at least a portion of the rotatable system components, the rotatable sensor assembly being coupled to rotate with the rotor portion of the rotary coupler; and a system support platform supporting at least portion of the stationary system components thereon, the system support platform being coupled to remain stationary with the stator portion of the rotary coupler.

13. The method of claim 12, where the system support platform is a mobile system support platform; and where the rotatable sensor assembly is a rotatable sensor array.

14. The method of claim 13, where the system support platform is an aircraft.

15. The method of claim 11, where the rotary system further comprises an optical rotary joint disposed within the center RF transmission line of the rotary coupler; where the stationary optical conductor portion comprises a stationary fiber optic portion; where the rotatable optical conductor portion comprises a rotatable fiber optic portion; where a terminal end of the stationary fiber optic conductor portion is positioned in axial end-to-end adjacent facing relationship with a terminal end of the rotatable fiber optic conductor portion within the optical rotary joint to form the rotational optical signal interface within the optical rotary joint between the stationary fiber conductor portion and the rotatable fiber optic conductor portion; and where the method further comprises:

passing optical signals between the stationary optical conductor portion and the rotatable optical conductor portion to communicate optical signals between the at least one stationary optical signal communication component and the at least one rotatable optical signal communication component while the rotatable sensor assembly and rotor portion of the rotary coupler are both stationary and rotating relative to the system support platform and stator portion of the rotary coupler.

16. The method of claim 15, where the stationary optical conductor portion and the rotatable optical conductor portion of the rotary coupler comprise respective optical fiber conductors that are disposed in adjacent rotatable relationship to form an on-axis optical signal channel; where the rotatable system components comprise multiple optical signal sources coupled to the rotatable optical signal communication component; where the rotatable optical signal communication component comprises optical multiplexer and demultiplexer circuitry coupled between the multiple optical signal sources and the rotatable optical conductor portion of the on-axis optical signal channel; where the stationary system components comprise multiple stationary sensor electronic components coupled to the rotatable optical signal communication component; where the stationary optical signal communication component comprises optical multiplexer and demultiplexer circuitry coupled between the multiple stationary sensor electronic components and the rotatable optical conductor portion of the on-axis optical signal channel; and where the method further comprises:

using the rotatable optical multiplexer and demultiplexer circuitry and the stationary optical multiplexer and demultiplexer circuitry in a cooperative manner to multiplex and demultiplex individual optical signals so as to simultaneously exchange individual optical signals across the on-axis optical signal channel between respective individual rotatable optical signal sources and corresponding stationary sensor electronic components while the rotatable sensor assembly and rotor portion of the rotary coupler are both stationary and rotating relative to the system support platform and stator portion of the rotary coupler.

17. The method of claim 15, where the stator portion further comprises a stationary RF conductor portion of a first concentric RF transmission line that is concentrically disposed around the center RF transmission line; where the rotor portion further comprises a rotatable RF conductor portion of a first concentric RF transmission line that is concentrically disposed around the center RF transmission line; where the stationary RF conductor portion and the rotatable RF conductor portion of the first concentric RF transmission line are disposed in adjacent rotatable relationship to form a second part of the center RF signal channel that extends across a rotational RF signal interface defined between the stationary RF conductor portion and the rotatable RF conductor portion of the first concentric RF transmission line to couple the at least one rotatable RF sensor in RF signal communication with the stationary RF sensor electronics; where the stationary RF conductor portion of the center RF transmission line further comprises a stationary center conductor coupler portion; where the rotatable RF conductor portion of the center RF transmission line further comprises a rotatable center conductor coupler portion received in rotatable concentric relationship with the stationary center conductor coupler portion to form the rotational RF signal interface of the center RF transmission line between concentric-fitting surfaces of the stationary RF conductor portion and the rotatable RF conductor portion of the center RF transmission line, the rotational RF signal interface being formed around the optical rotary joint; and where the method further comprises:

passing first RF signals across the center RF signal channel between the at least one rotatable RF sensor and the stationary RF sensor electronics for the least one rotatable RF sensor while the rotor portion of the rotary coupler is both stationary and rotating relative to the stator portion of the rotary coupler.

18. The method of claim 17, where the stationary optical conductor portion and the rotatable optical conductor portion of the rotary coupler comprise respective optical fiber conductors that are disposed in adjacent rotatable relationship to form an on-axis optical signal channel; where the rotatable system components comprise multiple optical signal sources coupled to the rotatable optical signal communication component; where the rotatable optical signal communication component comprises optical multiplexer and demultiplexer circuitry coupled between the multiple optical signal sources and the rotatable optical conductor portion of the on-axis optical signal channel; where the stationary system components comprise multiple stationary sensor electronic components coupled to the rotatable optical signal communication component; where the stationary optical signal communication component comprises optical multiplexer and demultiplexer circuitry coupled between the multiple stationary sensor electronic components and the rotatable optical conductor portion of the on-axis optical signal channel; and where the method further comprises:

using the rotatable optical multiplexer and demultiplexer circuitry and the stationary optical multiplexer and demultiplexer circuitry in a cooperative manner to multiplex and demultiplex individual optical signals so as to simultaneously exchange individual optical signals across the on-axis optical signal channel between respective individual rotatable optical signal sources and corresponding stationary sensor electronic components while the rotor portion of the rotary coupler is both stationary and rotating relative to the stator portion of the rotary coupler.

19. The method of claim 17, where the rotatable system components further comprise at least one additional rotatable RF sensor, and the stationary system components further comprise stationary RF sensor electronics for the at least one additional rotatable RF sensor; the stator portion further comprises a stationary RF conductor portion of a second concentric RF transmission line that is concentrically disposed around the first concentric RF transmission line; where the rotor portion further comprises a rotatable RF conductor portion of a second concentric RF transmission line that is concentrically disposed around the first concentric RF transmission line; where the stationary RF conductor portion and the rotatable RF conductor portion of the first concentric RF transmission line are disposed in adjacent rotatable relationship to form a first part of a concentric RF signal channel that extends across a rotational RF signal interface defined between the stationary RF conductor portion and the rotatable RF conductor portion of the first concentric RF transmission line to couple the at least one additional rotatable RF sensor in RF signal communication with the RF processing circuitry of the system support platform; where the stationary RF conductor portion and the rotatable RF conductor portion of the second concentric RF transmission line are disposed in adjacent rotatable relationship to form a second part of the concentric RF signal channel that extends across a rotational RF signal interface defined between the stationary RF conductor portion and the rotatable RF conductor portion of the second concentric RF transmission line; and where the method further comprises:

passing additional RF signals across the concentric RF signal channel between the at least one additional rotatable RF sensor and the stationary RF sensor electronics for the at least one additional rotatable RF sensor while the rotor portion of the rotary coupler is both stationary and rotating relative to the stator portion of the rotary coupler.

20. The method of claim 19, where the stationary optical conductor portion and the rotatable optical conductor portion of the rotary coupler comprise respective optical fiber conductors that are disposed in adjacent rotatable relationship to form an on-axis optical signal channel; where the rotatable system components comprise multiple optical signal sources coupled to the rotatable optical signal communication component; where the rotatable optical signal communication component comprises optical multiplexer and demultiplexer circuitry coupled between the multiple optical signal sources and the rotatable optical conductor portion of the on-axis optical signal channel; where the stationary system components comprise multiple stationary sensor electronic components coupled to the rotatable optical signal communication component; where the stationary optical signal communication component comprises optical multiplexer and demultiplexer circuitry coupled between the multiple stationary sensor electronic components and the rotatable optical conductor portion of the on-axis optical signal channel; and where the method further comprises:

using the rotatable optical multiplexer and demultiplexer circuitry and the stationary optical multiplexer and demultiplexer circuitry in a cooperative manner to multiplex and demultiplex individual optical signals so as to simultaneously exchange individual optical signals across the on-axis optical signal channel between respective individual rotatable optical signal sources and corresponding stationary sensor electronic components.

\* \* \* \* \*